US012798402B2

(12) United States Patent
Oshita et al.

(10) Patent No.: US 12,798,402 B2
(45) Date of Patent: Nov. 17, 2026

(54) ELECTRICALLY POWERED WATERCRAFT

(71) Applicant: HONDA MOTOR CO., LTD., Tokyo (JP)

(72) Inventors: Yuki Oshita, Saitama (JP); Shin Miura, Saitama (JP); Fumiyoshi Kambara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 713 days.

(21) Appl. No.: 18/189,742

(22) Filed: Mar. 24, 2023

(65) Prior Publication Data

US 2024/0317078 A1 Sep. 26, 2024

(51) Int. Cl.
*B60L 50/60* (2019.01)
*B63H 21/17* (2006.01)
*B63H 21/36* (2006.01)

(52) U.S. Cl.
CPC .............. *B60L 50/66* (2019.02); *B63H 21/17* (2013.01); *B63H 21/36* (2013.01); *B60L 2200/32* (2013.01)

(58) Field of Classification Search
CPC ..... B60L 50/66; B60L 2200/32; B63H 21/17; B63H 21/36
See application file for complete search history.

(56) References Cited

U.S. PATENT DOCUMENTS

| | | | | |
|---|---|---|---|---|
| 5,371,454 A * | 12/1994 | Marek | B60L 58/15 | 320/108 |
| 7,009,110 B1 * | 3/2006 | Gretz | F04D 25/088 | 248/342 |
| 2007/0171315 A1* | 7/2007 | Aoyama | G01S 19/19 | 342/357.57 |
| 2011/0244740 A1* | 10/2011 | Daikoku | B63H 20/007 | 440/6 |
| 2013/0248243 A1* | 9/2013 | Dinh | H02G 3/081 | 174/535 |
| 2014/0238738 A1* | 8/2014 | Korcz | H02G 3/086 | 174/542 |
| 2018/0054050 A1* | 2/2018 | Thomas | H02G 3/088 | |

* cited by examiner

*Primary Examiner* — Stephen P Avila
(74) *Attorney, Agent, or Firm* — Armstrong Teasdale LLP

(57) ABSTRACT

An electric unit for electrically powered watercraft, comprising an electrical box (5) including a side wall and a detachable top cover (21), and a battery box (4) provided separately from the electrical box, wherein an electric component (22-25) is attached to an inner surface of the side wall.

20 Claims, 11 Drawing Sheets

ELECTRICALLY POWERED WATERCRAFT

TECHNICAL FIELD

The present invention relates to electrically powered watercraft, and in particular to an improved electric unit for electrically powered watercraft.

BACKGROUND ART

In recent years, active efforts have been made toward the realization of a low-carbon society or a decarbonized society, and research and development efforts are being directed to electric propulsion devices that reduce CO2 emissions and improve energy efficiency for use in various vehicles including land vehicles, aircraft, and watercraft.

Electrically powered watercraft is provided with an electric unit which includes a battery box and an electrical box housing a power control unit and other electric components, in addition to a propulsion unit such as an outboard motor. In a limited space of watercraft, such as small boats fitted with an electric outboard motor, it is important to position such components and devices within the hull in an advantageous manner. In particular, the electric unit is required to be arranged within a limited space of the watercraft such that the electric component is adequately protected from water and other foreign matter, and can be maintained and serviced with ease.

SUMMARY OF THE INVENTION

In view of such a problem of the prior art, a primary object of the present invention is to provide an electric unit for electrically powered watercraft which is adequately protected from water and other foreign matter and easy to maintain.

To achieve such an object, the present invention provides an electric unit for electrically powered watercraft, comprising: an electrical box (5) including a side wall; a detachable top cover (21) provided on a top end of the electrical box; and a battery box (4) provided separately from the electrical box, wherein an electric component (22-25) is attached to an inner surface of the side wall.

Since the electric component is attached to the inner surface of the side wall of the electrical component, and the top end of the electrical box is closed by the top cover, the electric component is protected from water and other foreign matter. Further, the removable top cover allows ready access to the electric component.

Preferably, in this electric unit, the side wall is formed by a pair of sheet metal members (5A, 5B) each bent at a substantially right angle.

Since the electrical box is made of simple members, and is easy to assemble. The manufacturing cost can be reduced. Further, by separating the electrical box into two parts, the maintenance and servicing of the electric component can be performed with ease.

Preferably, in this electric unit, the electrical box has a substantially open bottom end.

The open bottom end of the electrical box allows water which may have entered the electrical box to be quickly expelled. Further, an open bottom end allows a favorable ventilation of the interior of the electrical box.

Preferably, in this electric unit, the electrical box is provided with at least two legs (27) formed as localized lower extensions of the side wall.

The legs elevate the lower edge of the side wall from the floor surface so that water that may have entered the electrical box can be readily expelled.

Preferably, in this electric unit, the legs are provided with flanges for securing the electrical box to a floor surface.

Thus, the legs serve the dual purposes.

Preferably, in this electric unit, an upper edge of the electrical box is provided with a notch, and a grommet (26) is fitted in the notch, an electric cable (6, 7) extending out of the electrical box through the grommet.

Thereby, the cable is allowed to extend from an elevated part of the electrical box so that the cable is protected from water. Further, the grommet can be fitted into the notch with ease as compared to a case where the grommet is fitted into a hole.

Preferably, in this electric unit, the grommet is provided with a pair of openings through which cables are passed one above another.

Thereby, two cables, one leading to the battery box and the other to the motor, can be extended from the electrical box by using a simple structure so that the manufacturing cost can be reduced.

Preferably, in this electric unit, the top cover abuts against an upper edge of the grommet.

Thereby, the grommet can be retained in the notch from above in a reliable manner.

Preferably, in this electric unit, the top cover with provided with a depending flange (21A) that abuts against an outer surface of an upper end part of the grommet.

Thereby, the grommet can be retained in the notch from outside in a reliable manner.

Preferably, in this electric unit, the battery box has a battery receiving opening (13) facing an inboard side of the watercraft, and a door (16) that is configured to be opened and closed about an axis extending along an upper edge of the battery receiving opening.

Since the battery box is accessed from the inboard side, and fitted with a door, the battery is protected from water that may be splashed upon the battery box.

Preferably, in this electric unit, a cable (6) electrically connecting a battery in the battery box to the electric component in the electrical box extends from an outboard side of the battery box.

Thus, the cable is prevented from interfering with the moving of a battery into and out of the battery box. Particularly, when the battery box is positioned immediately in front of the gunwale of the watercraft, the cable can be extended from the battery box along the inner surface of the gunwale so that the cable can be protected from water, and without interfering with other parts of the watercraft.

Preferably, in this electric unit, the electric component includes a connector for connecting an external diagnosis device.

Owing to the detachable top cover, the connector for connecting an external diagnosis device can be accessed with ease.

The present invention thus provides an electric unit for electrically powered watercraft which is adequately protected from water and other foreign matter and easy to maintain.

BRIEF DESCRIPTION OF THE DRAWING(S)

DESCRIPTION OF THE PREFERRED EMBODIMENT(S)

Preferred embodiments of the present invention will be described in the following with reference to the appended drawings.

Figure 1:
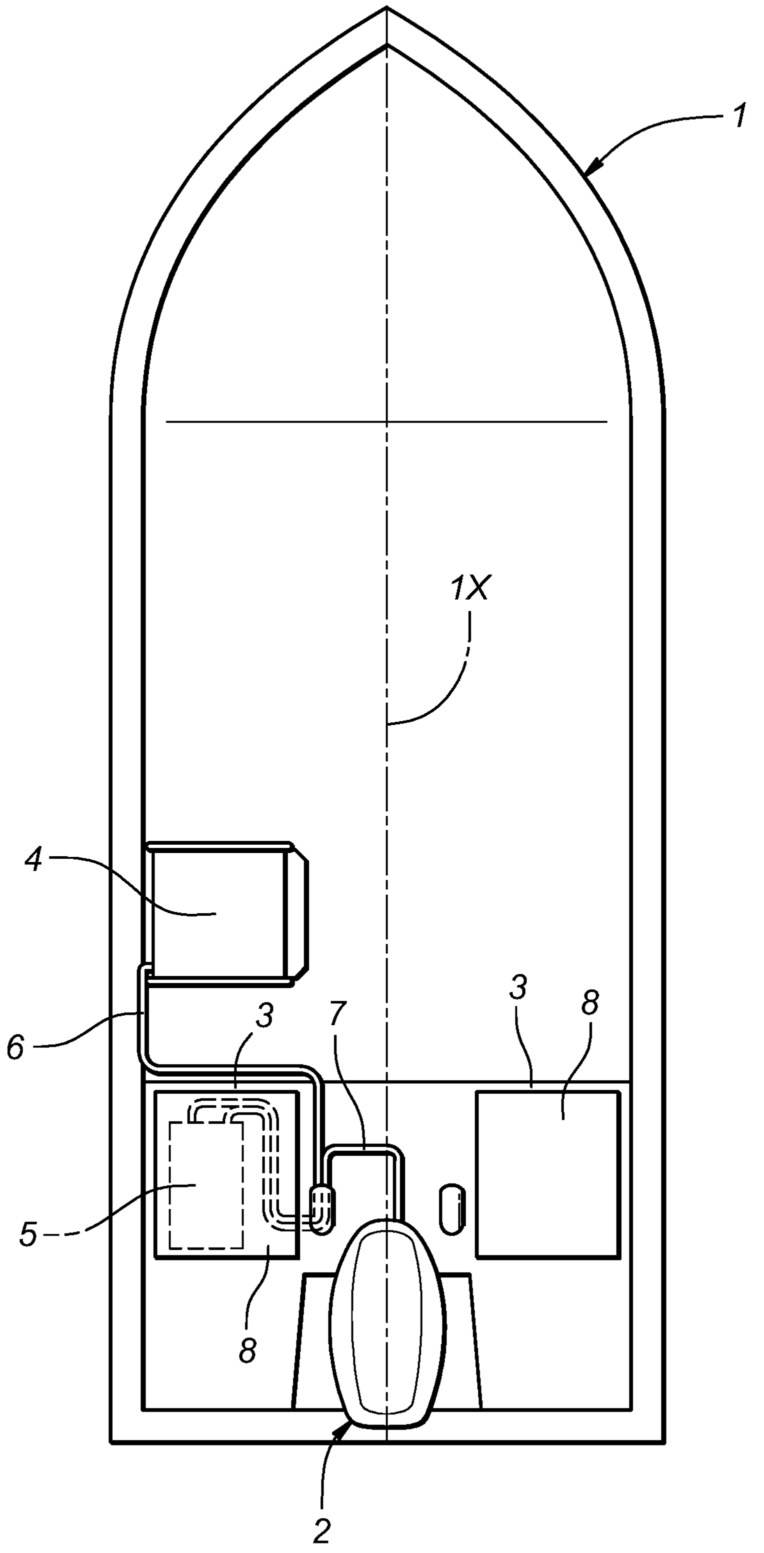
FIG. 1 is a simplified top view of watercraft according to an embodiment of the present invention.

FIG. 1 shows a boat as an electrically powered watercraft including a hull 1 and an outboard motor 2 as a propulsion device fitted to a rear end part of the hull 1. The boat is provided with a pair of storage compartments 3 on either side of the hull 1 immediately in front of the outboard motor 2. Two storage compartments 3 are positioned symmetrically to a central longitudinal axis 1X of the hull 1. In the illustrated embodiment, the storage compartments 3 are formed as parts of a box-shaped structure extending substantially over the entire width of the hull 1 in a rear end part of the hull 1 immediately in front of the outboard motor 2. In the illustrated embodiment, the storage compartments 3 are provided on either lateral end of the box-shaped structure, and are each provided with a hatch door 8 in the top end thereof which may be swung upward to allow access into the storage compartment 3. The hinge axis of the hatch door 8 may extend laterally along a rear part of the storage compartment 3. The part of the box-shaped structure located between the hatch doors 8 may have a fixed top wall part.

An electrical box 5 accommodating electric components therein is positioned inside the storage compartment 3 on the left side of the hull 1. A battery box 4 is positioned on the left side of the hull 1 adjacent to the gunwale on the left side and at a certain distance from the front end of the storage compartment 3. The height of the top end of the storage compartment 3 is selected so as to comfortably seat an operator thereon. The operator seated on top of the storage compartment is able to steer or otherwise operate the outboard motor 2. In other words, an upper surface of the storage compartments 3 forms an operator's seat. The space between the battery box 4 and the storage compartment 3 is dimensioned so as not to interfere with the legs of the operator who is seated on the storage compartment 3.

A first cable 6 extends from the battery box 4 to the electrical box 5, and a second cable 7 extends from the electrical box 5 to the outboard motor 2. The first cable 6 and the second cable 7 are electric cables.

Figure 2:
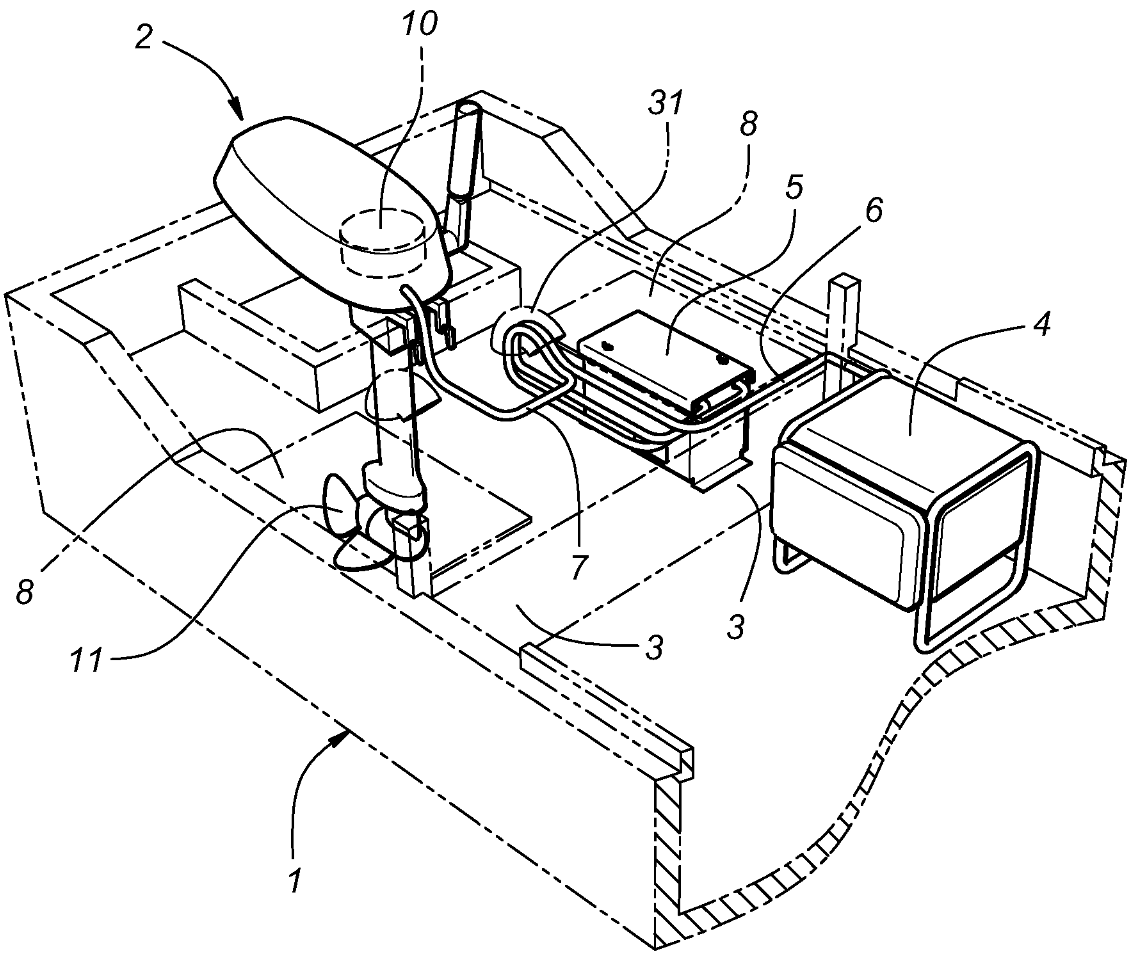
FIG. 2 is a fragmentary perspective view of a rear part of the watercraft.

As shown in FIG. 2, the outboard motor 2 includes a propeller 11 as a propulsion unit positioned in a lower end part of the outboard motor 2 so as to be submerged in the water, and an electric motor 10 provided in an upper part of the outboard motor 2, and has an output shaft (not shown in the drawings) which is connected to the propeller 11 in a power transmitting relationship.

Figure 3:
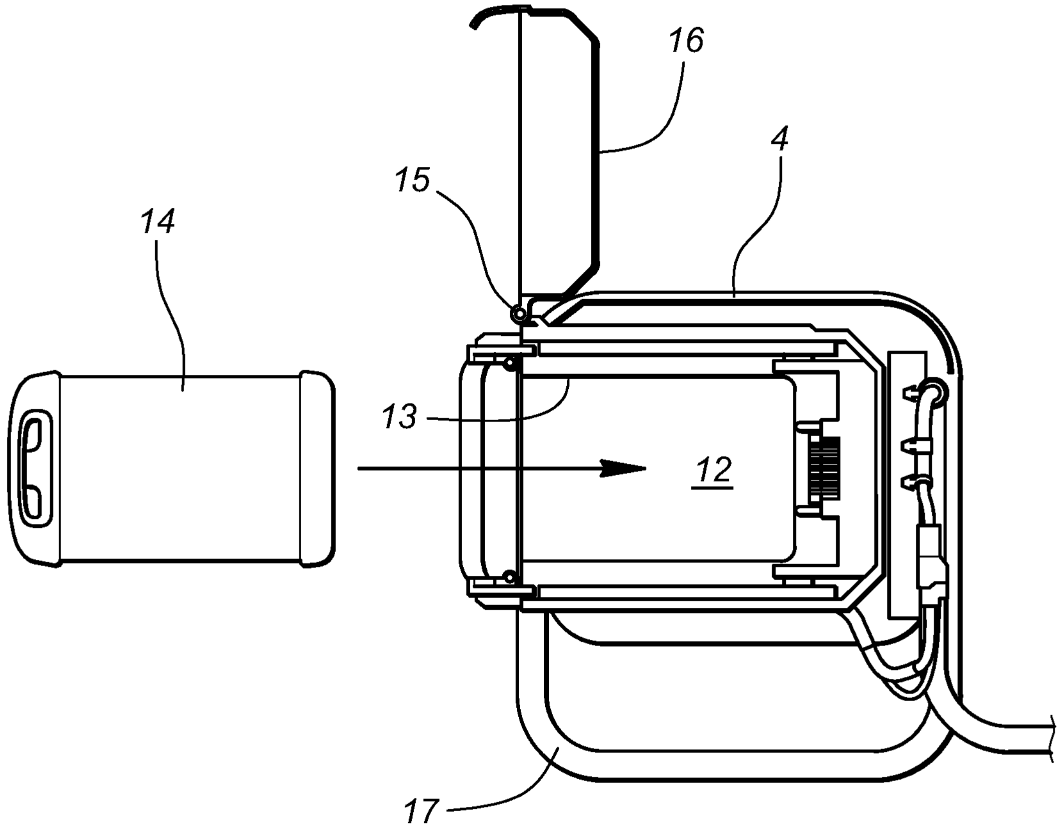
FIG. 3 is a side view of the battery box illustrating the mode of use thereof.

As best shown in FIG. 3, the battery box 4 has a battery receiving opening 13 that faces inboard, and internally defines a battery receiving chamber 12 for receiving a pair of batteries 14 one next to the other. The battery box 4 is fitted with a door 16 via a hinge 15 having a hinge axis extending along the upper edge of the battery receiving opening 13 or in the fore and aft direction. That is, the door 16 is configured to be opened and closed about the hinge axis of the hinge 15. The battery box 4 is further provided with a pair of legs 17 that space the bottom end of the battery box 4 from the floor or deck of the hull 1. In the illustrated embodiment, the legs 17 are parts of a pipe frame that serves as the main structure of the battery box 4. The battery box 4 is formed by plastic panels secured to this pipe frame.

Figure 4:
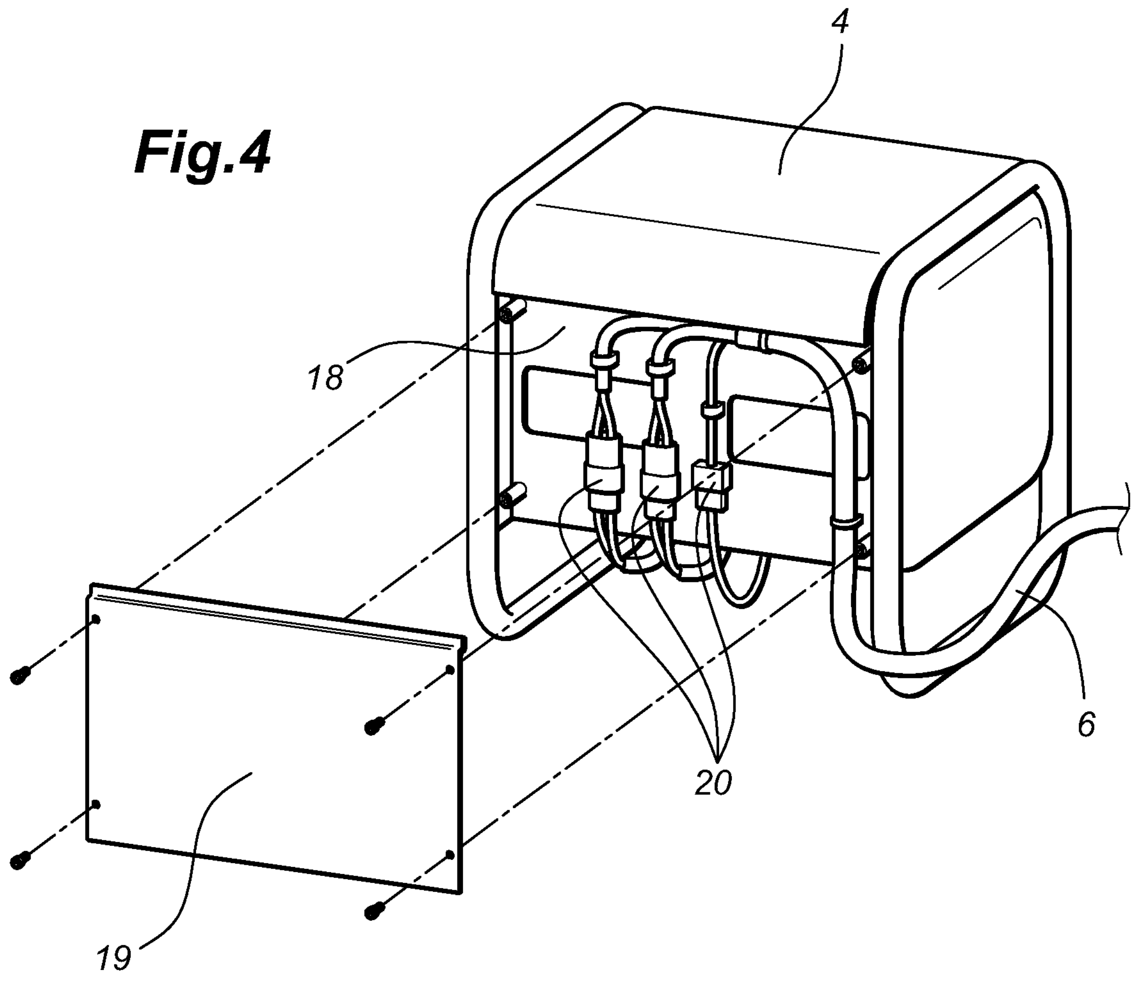
FIG. 4 is an exploded perspective rear view of the battery box.

FIG. 4 shows the battery box 4 from the rear. The rear side or the outboard side of the battery box 4 is provided with an inner wall 18 consisting of a vertical wall which extends vertically, and is permanently attached to the main frame of the battery box 4, and an outer wall 19 which is detachably attached to the main frame of the battery box 4 via fasteners such as screws. The electric wires that extend from the connectors (not shown in the drawings) for electric connection to the batteries 14 are passed under the lower edge of the inner wall 18, and extend upward along the outer surface of the inner wall 18. The electric wires are provided with connectors 20 in the parts thereof on the outer side (outboard side) of the inner wall 18. These wires are retained to the outer side of the inner wall 18 by fasteners. The electric wires are bundled into the first cable 6, and are drawn out from the lower edge of the outer wall 19. The first cable 6 then extends upward along the outer side of the battery box 4 to an elevated position thereof, and passed along the gunwale and the storage compartments 3 at a certain height from the floor of the hull 1.

Figure 5:
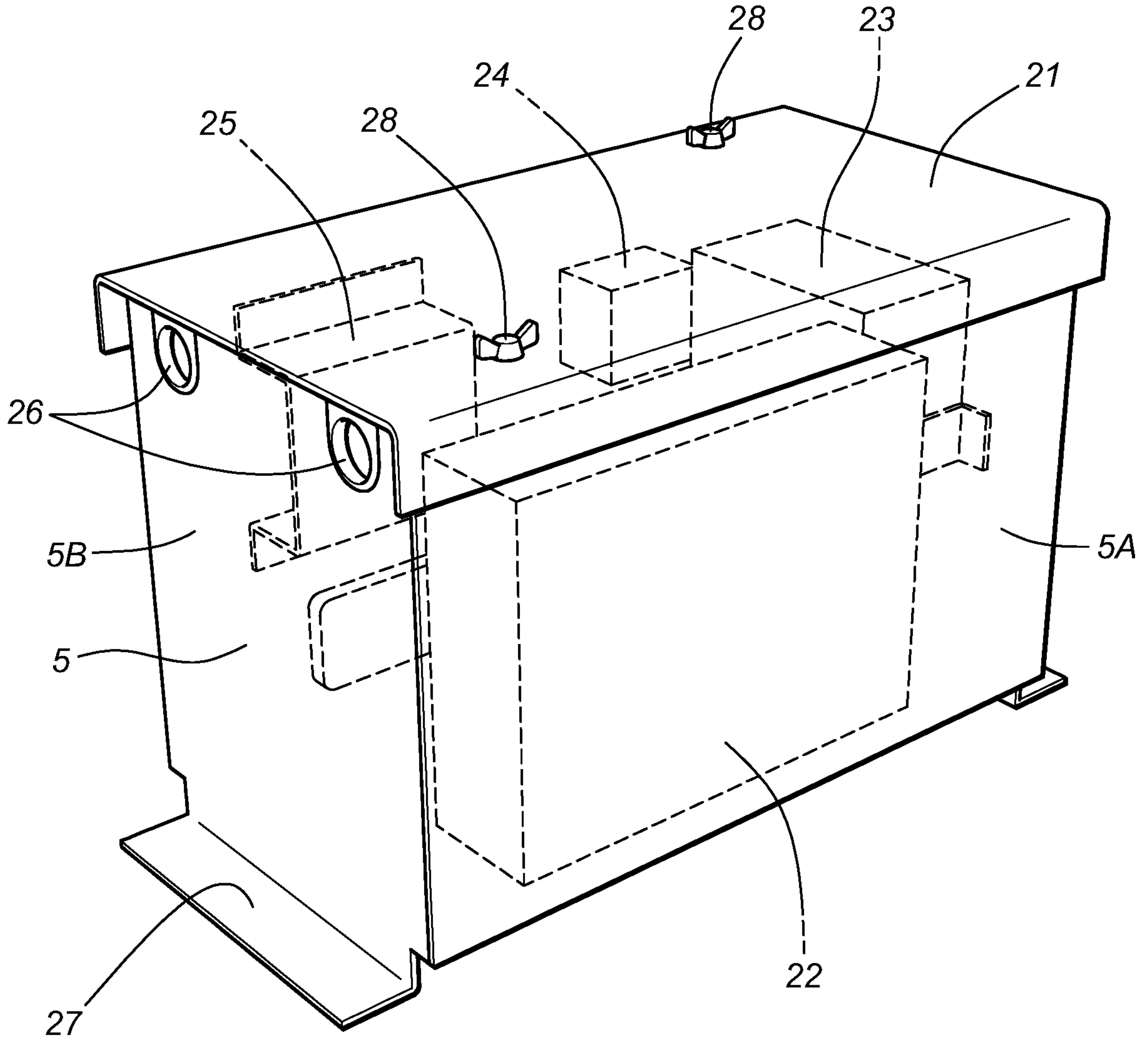
FIG. 5 is a see-through perspective view of the electrical box.
Figure 7:
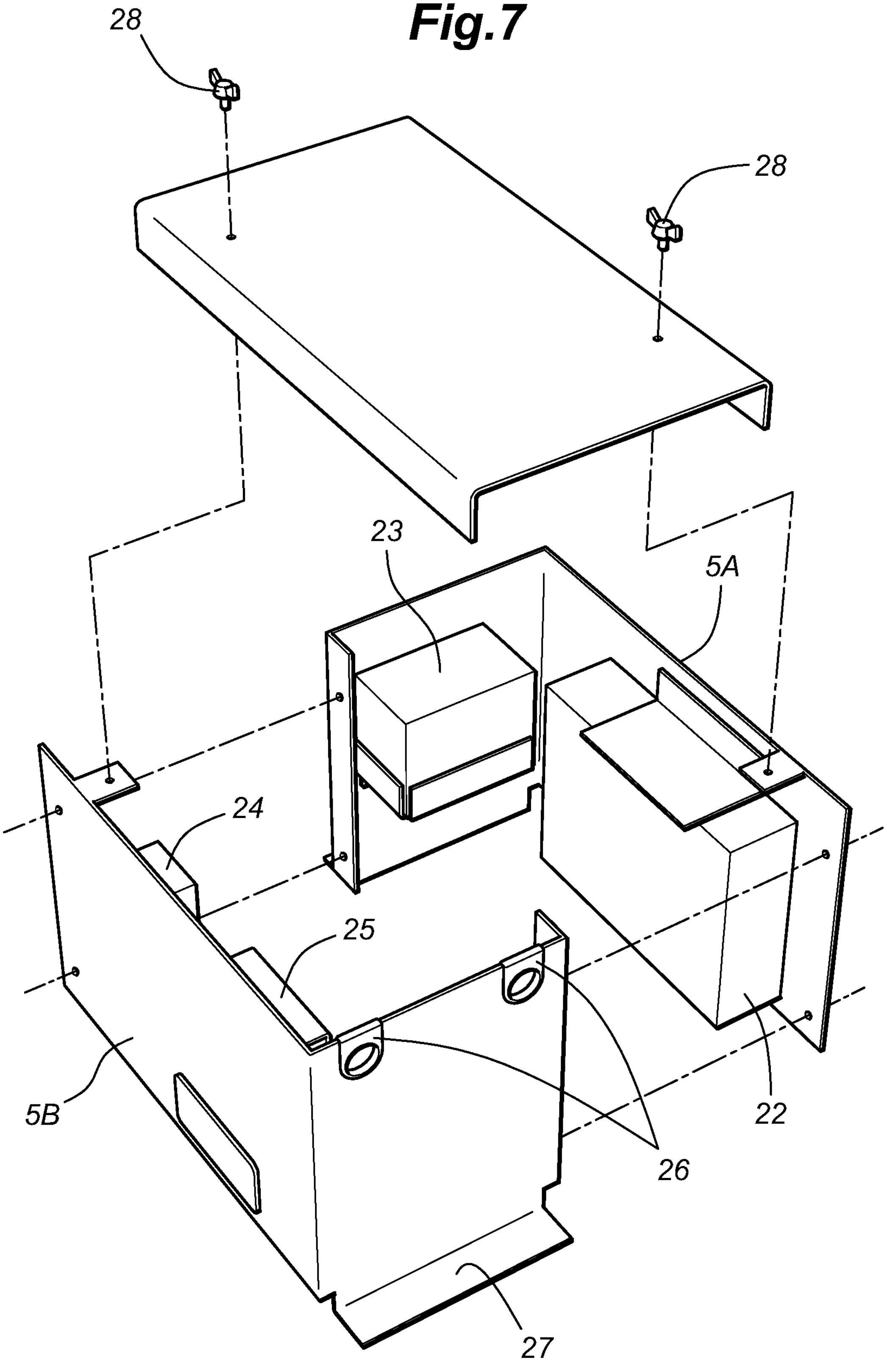
FIG. 7 is an exploded perspective view of the electrical box.

FIG. 5 shows the electrical box 5 which is made of sheet metal in the illustrated embodiment. As shown in FIG. 7, the electrical box 5 consists of two halves 5A and 5B consisting of substantially vertical side walls each having an L-shape in top view, and joined to each other by screws into a box-shape which is elongated in one direction. Each of the halves 5A and 5B is formed by a sheet metal member bent at substantially right angle. The lower edge of the electrical box 5 is raised from the floor of the hull 1 by a pair of legs 27 formed as localized lower extensions of the electrical box 5. The lower edge of each leg 27 is formed with an external flange which may be used to fasten the electrical box 5 to the floor of the hull 1.

Figure 6:
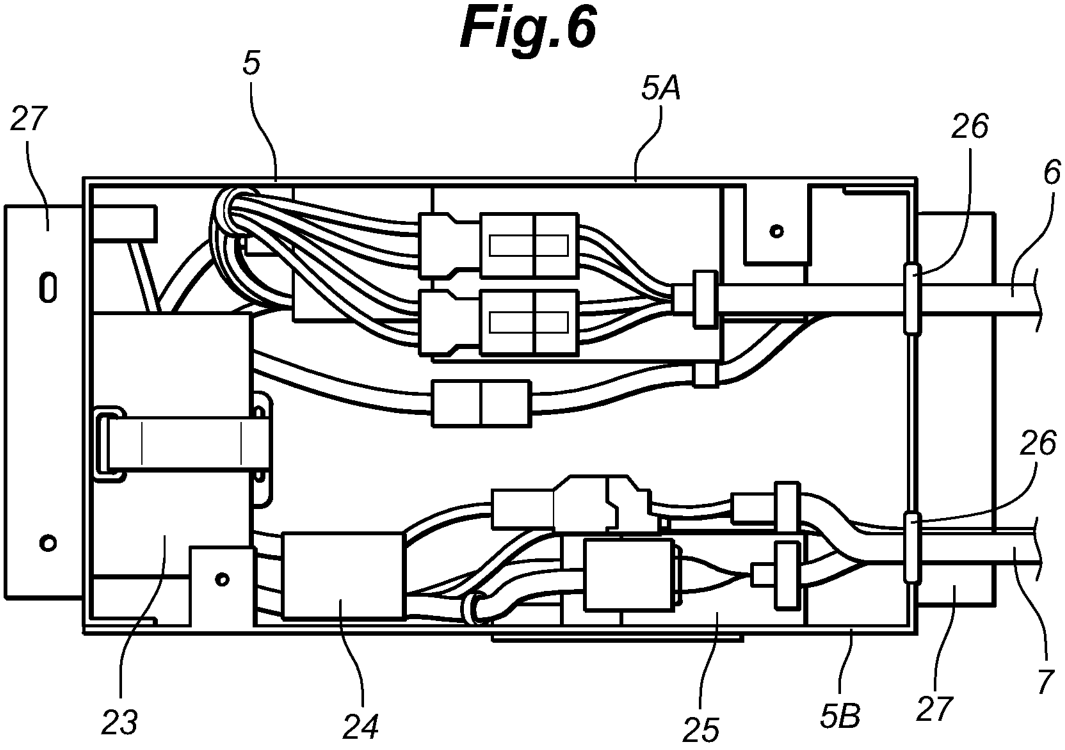
FIG. 6 is a front view of the diagnosis connector box provided in the electrical box.

The electric components accommodated in the electrical box 5 include a power control unit 22 incorporated with power control devices and attached to the long side of the first half 5A of the electrical box 5, a 12 volt battery 23 attached to the short side of the first half 5A of the electrical box 5, a fuse box 24 attached to the long side of the second half 5B of the electrical box 5, and a connector box 25 supporting (or accommodating) electric connectors for connecting an external diagnosis device therein, and also attached to the long side of the second half 5B of the electrical box 5. These electric components are attached to the inner side of the electrical box 5. The upper edge of the short side of the second half 5B of the electrical box 5 is provided with a pair of notches each fitted with a grommet 26 through which the first cable 6 and the second cable 7 extend. The upper end of the electrical box 5 is closed by a top cover 21 which is detachably secured to the top end of the electrical box 5 by wing nuts 28. The top cover 21, when placed, abuts against the upper ends of the grommets 26, and helps the grommets to be secured in place. FIG. 6 shows the interior of the connector box 25 containing electric connectors.

The first cable 6 electrically connects the electric component in the electrical box 5 to the battery 14 in the battery box 4, and the second cable 7 electrically connects the electric component in the electrical box 5 to the electric motor 10 of the outboard motor 2.

Figure 8:
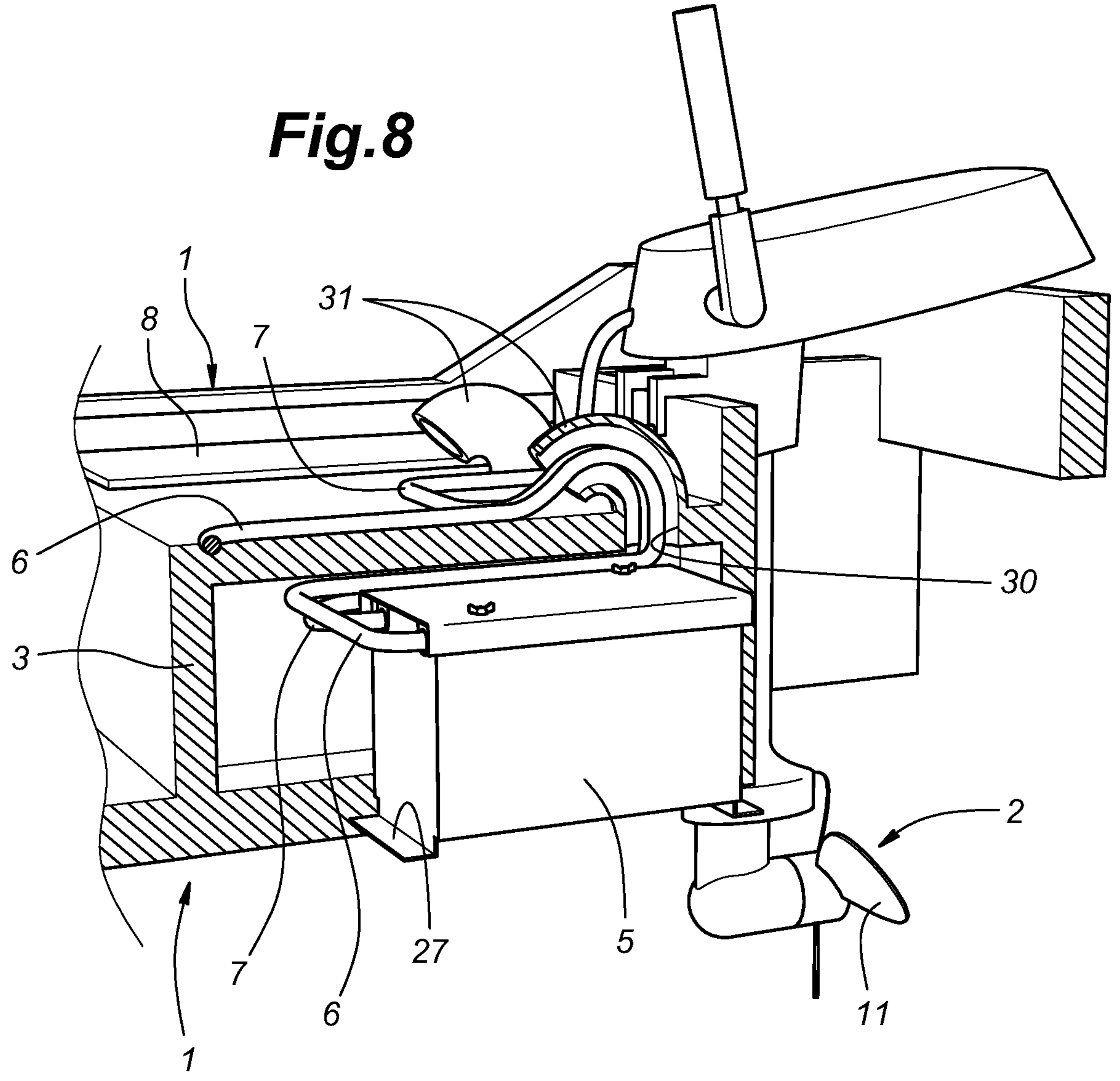
FIG. 8 is a fragmentary sectional view of a left rear part of the watercraft showing the electrical box and the second cable in greater detail.

FIG. 8 shows the layout of the first cable 6 and the second cable 7. The first cable 6 extends from the battery box 4 along the inner side of the gunwale and is led into the storage compartment 3 via a hole 30 formed in the fixed top wall part of the storage compartment 3. The hole 30 is provided with a tubular member 31 or a funnel which is shaped like an inverted letter J or inverted letter U. The base end of the tubular member 31 is fixed to the top wall of the storage compartment 3 so as to communicate with the interior of the storage compartment 3. Since the free end or open end of the tubular member 31 faces substantially downward, water or any other foreign matter is prevented from entering the storage compartment 3 while the cables that are passed through the hole 30 and the tubular member 31 are allowed to move freely inside the hole 30 and the tubular member 31.

The second cable 7 extends from the electrical box 5, and is passed through the hole 30 and the tubular member 31. The second cable 7 drawn out from the tubular member 31 extends to the outboard motor 2, and is electrically connected to the motor 10 thereof. The second cable 7 is given with a necessary amount of slack so that the second cable 7 is not excessively tensioned or bent even when the outboard motor 2 is steered from one extreme end to the other.

Figure 9A:
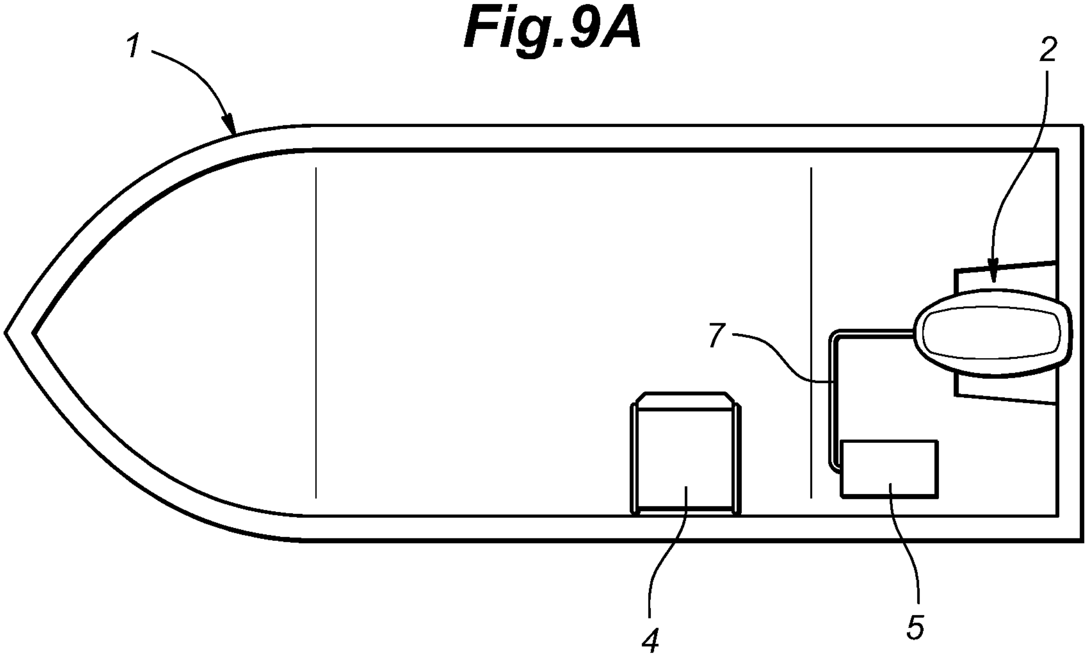
FIG. 9A is a simplified top view of the watercraft showing a first possible arrangement of the second cable.
Figure 9B:
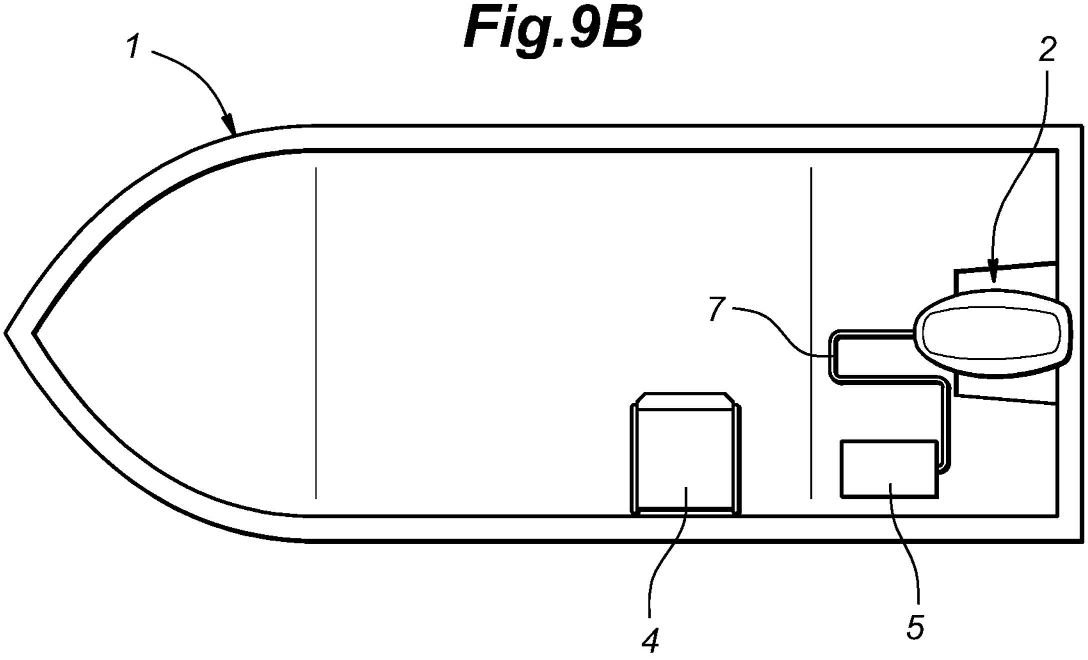
FIG. 9B is a view similar to FIG. 9A showing a second possible arrangement of the second cable.

FIGS. 9A and 9B compare two possible arrangements of the second cable 7. In either case, the electrical box 5 is positioned on a left side part of the hull 1 and slightly ahead of the outboard motor 2. In the case shown in FIG. 9A, the second cable 7 extends from the front end of the electrical box 5 and is connected to the front end of the outboard motor 2 at the other end. In this case, the length of the second cable 7 is comparatively short, but the second cable 7 is required to contain enough slack to allow the outboard motor 2 to be steered from one extreme end to the other. In the case shown in FIG. 9B, the second cable 7 extends from the rear end of the electrical box 5 and is connected to the front end of the outboard motor 2 at the other end. In this case, the second cable 7 extends in a tortuous path so that a large amount of slack can be provided in the second cable 7 without making the second cable 7 unwieldy.

Figure 10:
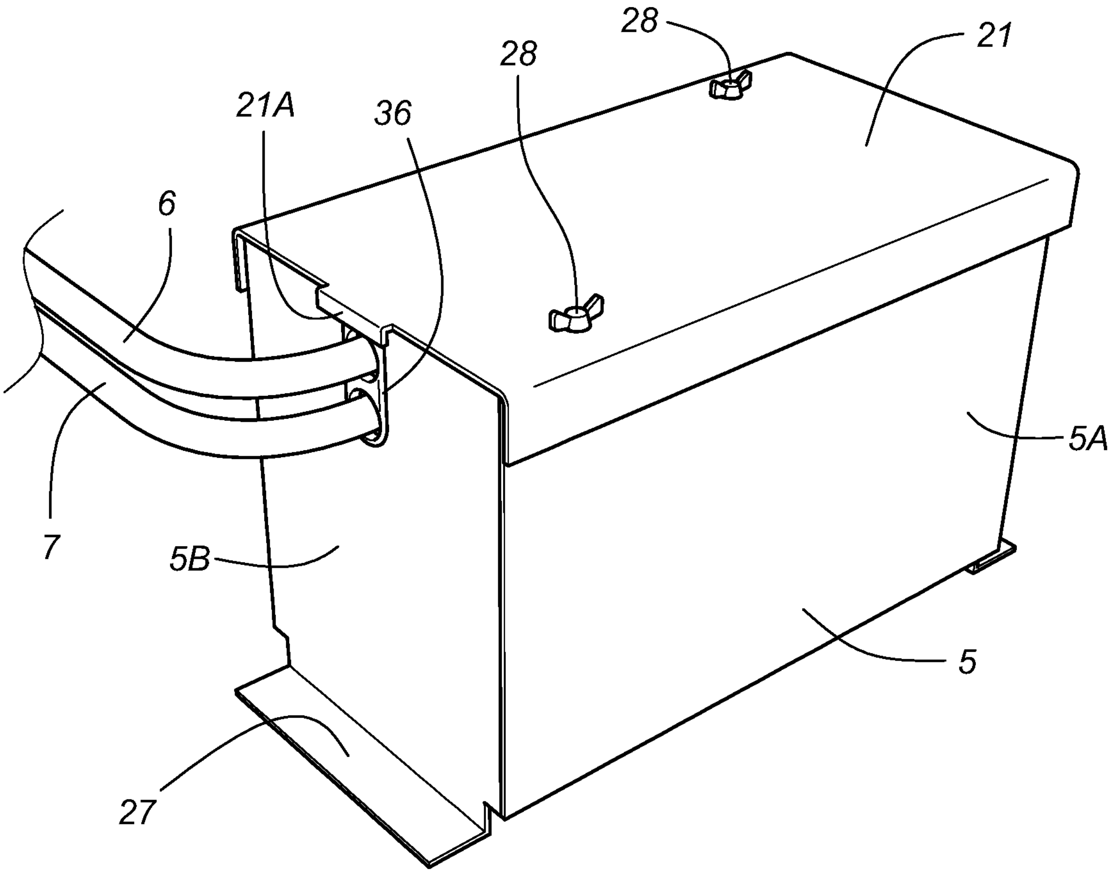
FIG. 10 is a modified embodiment of the arrangement of the parts of the cables extending from the electrical box.

FIG. 10 shows a modified embodiment of the present invention. The first cable 6 and the second cable are drawn out from the electrical box 5 via a single notch in the upper edge of the electrical box 5. This notch receives a single grommet 36 having two openings one above the other; one for the first cable 6, and the other for the second cable 7. The top cover 21 not only presses the grommet 36 from above, but is also provided with a flange 21A which abuts against an outer surface of the upper edge of the grommet 36 from outside. As a result, the grommet 36 is protected from being dislodged from the notch both from above and from outside.

Figure 11:
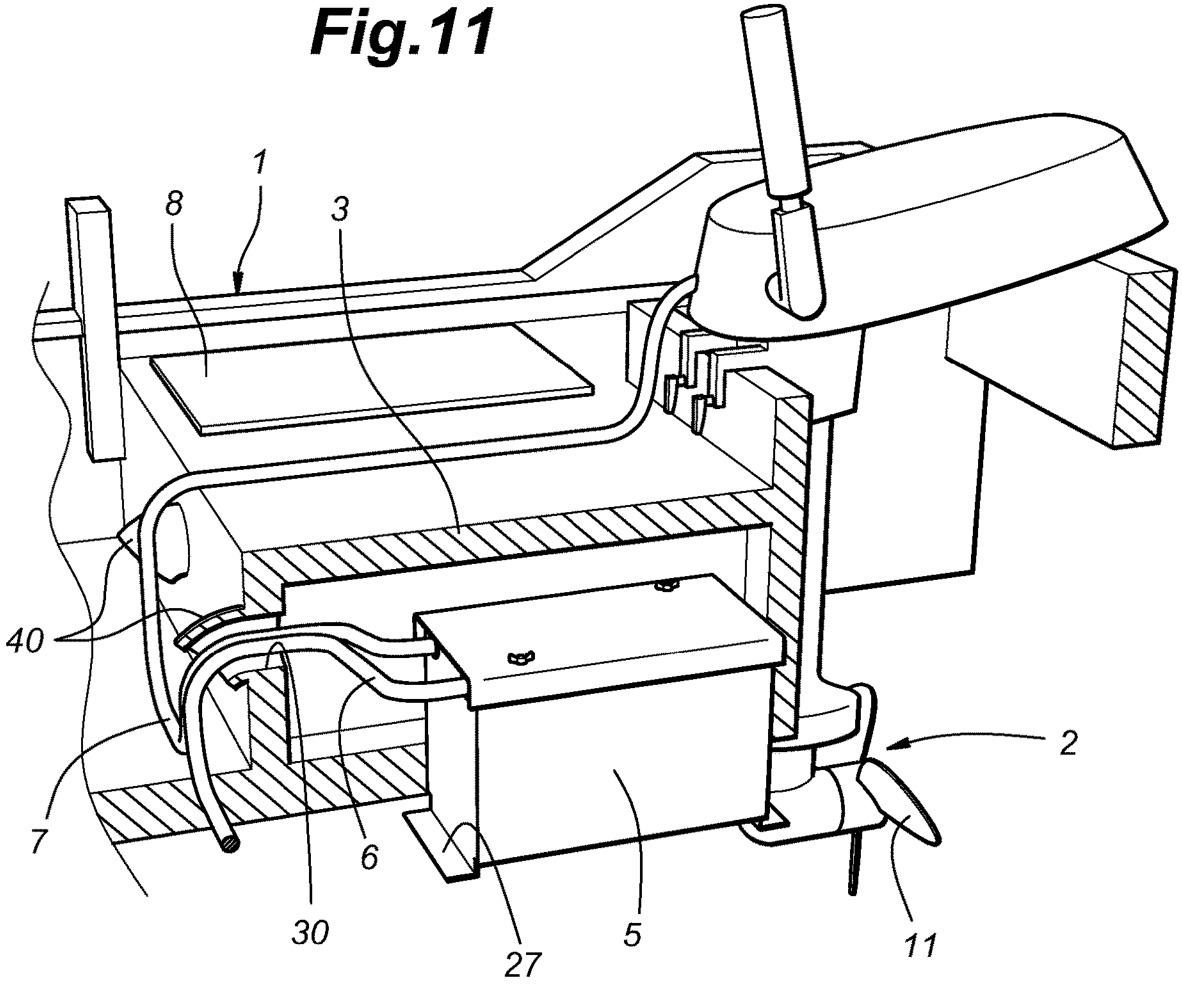
FIG. 11 is a view similar to FIG. 8 showing another modified embodiment of the present invention.

FIG. 11 shows another modified embodiment of the present invention. In this case, the hole 30 for drawing out the first cable 6 and the second cable 7 from the storage compartment 3 is provided on the front wall of the storage compartment 3, instead of the upper wall. This hole 30 is fitted with a tubular member 40 or a funnel which is shaped like letter L or J on its side. The base end of the tubular member 31 is fixed to the front wall of the storage compartment 3 so as to communicate with the interior of the storage compartment 3, and the opposite end or the free end of the tubular member 31 faces substantially downward. Thereby, water or any other foreign matter is prevented from entering the storage compartment 3 while the cables that are passed through the hole 30 and the tubular member 40 are allowed to move freely inside the hole 30 and the tubular member 40.

The present invention has been described in terms of a specific embodiment, but the present invention is not limited by such an embodiment and can be modified in various ways without departing from the scope of the present invention. For instance, the box-like structure in the rear end part of the hull 1 is provided with a pair of hatch doors 8 in the foregoing embodiment, but the top wall of the entire box-like structure may also be entirely fixed, and the access into the storage compartments 3 may be gained by a door or door provided in the front wall of the box-like structure. In the above embodiments, the present invention is applied to boats, but the electric watercraft according to the present invention is not limited to this example, and may also be pontoon, cabin boats, offshore boats, center console boats, runabouts, and other boats. The propulsion device is not limited to the outboard motor 2, but may also be an inboard/outboard motor. Alternatively, the battery box 4 and the electrical box 5 may be arranged on the different sides of the hull 1, and the watercraft may be fitted with two or more electric propulsion devices positioned one next to the other.

Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. An electric unit for an electrically powered watercraft, comprising:
- an electrical box accommodating an electric component and including a side wall;
- a detachable top cover provided on a top end of the electrical box; and
- a battery box provided separately from the electrical box,
- wherein the electric component is attached to an inner surface of the side wall, and
- wherein an upper edge of the electrical box is provided with a notch, and a grommet is fitted in the notch, the grommet receiving an electric cable extending out of the electrical box.

2. The electric unit according to claim 1, wherein the side wall is formed by a pair of sheet metal members each bent at a substantially right angle.

3. The electric unit according to claim 1, wherein the electrical box has a substantially open bottom end.

4. The electric unit according to claim 1, wherein the electrical box is provided with at least two legs formed as localized lower extensions of the side wall.

5. The electric unit according to claim 4, wherein the legs are provided with flanges for securing the electrical box to a floor surface.

6. The electric unit according to claim 1, wherein the grommet is provided with a pair of openings through which electric cables are passed one above another.

7. The electric unit according to claim 1, wherein the top cover abuts against an upper edge of the grommet.

8. The electric unit according to claim 1, wherein the top cover is provided with a depending flange that abuts against an outer surface of an upper end part of the grommet.

9. The electric unit according to claim 1, wherein the battery box has a battery receiving opening facing an inboard side of the electrically powered watercraft, and a door that is configured to be opened and closed about an axis extending along an upper edge of the battery receiving opening.

10. The electric unit according to claim 9, wherein the electric cable electrically connecting a battery in the battery box to the electric component in the electrical box extends from an outboard side of the battery box.

11. The electric unit according to claim 1, wherein the electric component includes a connector for connecting an external diagnosis device.

12. The electric unit according to claim 1, wherein the electrical box consists of two halves each consisting of the side wall and having an L-shape in top view, and joined to each other into a box-shape.

13. The electric unit according to claim 1, wherein the electric component includes at least one of a power control unit incorporated with a power control device, a battery, a fuse box, and a connector box supporting electric connectors.

14. The electric unit according to claim 1, wherein the top cover is detachably secured to the top end of the electrical box by wing nuts.

15. The electric unit according to claim 1, wherein the electrical box is configured to be accommodated inside a storage compartment provided on a hull of the watercraft.

16. The electric unit according to claim 15, wherein a tubular member which is shaped like an inverted letter J or an inverted letter U and has an open end facing downward is provided at a hole formed on a wall part of the storage compartment, and the electric cable passes through the hole and the tubular member.

17. The electric unit according to claim 16, wherein the hole is formed on a top wall of the storage compartment.

18. The electric unit according to claim 16, wherein the hole is formed on a front wall of the storage compartment.

19. An electric unit for an electrically powered watercraft, comprising:

an electrical box accommodating an electric component and including a side wall;

a detachable top cover provided on a top end of the electrical box; and a battery box provided separately from the electrical box, wherein the electric component is attached to an inner surface of the side wall, and wherein the battery box has a battery receiving opening facing an inboard side of the electrically powered watercraft, and a door that is configured to be opened and closed about an axis extending along an upper edge of the battery receiving opening.

20. The electric unit according to claim 19, wherein the battery box internally defines a battery receiving chamber configured to receive a pair of batteries one next to the other.

* * * * *